(No Model.)

R. D. WATSON.
VALVE.

No. 593,258.  Patented Nov. 9, 1897.

WITNESSES  INVENTOR
            R. D. Watson

UNITED STATES PATENT OFFICE.

RICHARD D. WATSON, OF TOLEDO, OHIO.

VALVE.

SPECIFICATION forming part of Letters Patent No. 593,258, dated November 9, 1897.

Application filed May 3, 1897. Serial No. 634,969. (No model.)

*To all whom it may concern:*

Be it known that I, RICHARD DAVID WATSON, a citizen of the United States, residing at Toledo, county of Lucas, State of Ohio, have invented a new and useful Valve, of which the following is a specification.

My invention relates to that class of valves wherein the action required is that when the piston or plunger of the engine or pump in which it is being used is approaching it it shall be open and that when the piston or plunger is receding from it it shall be closed. I attain this reverse of the usual action of valves by the mechanism shown in the accompanying drawings, in which—

Figure 1:
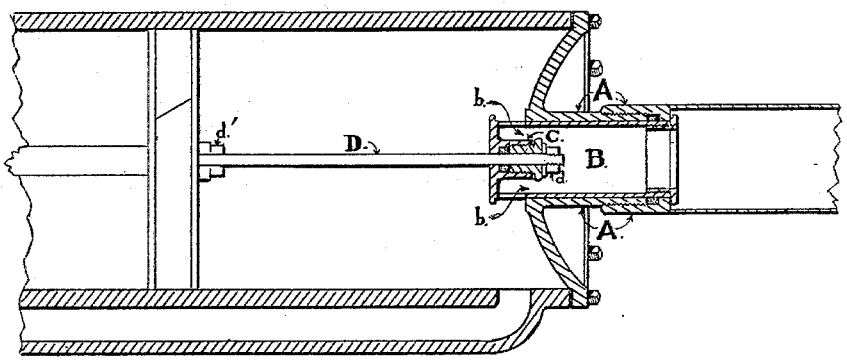
Figure 2:
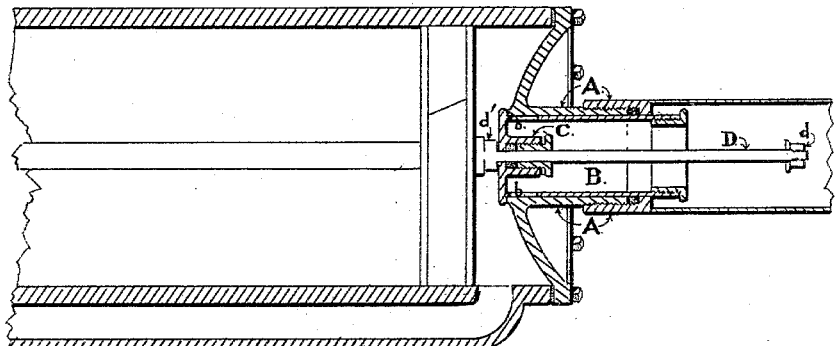
Figures 3, 4:
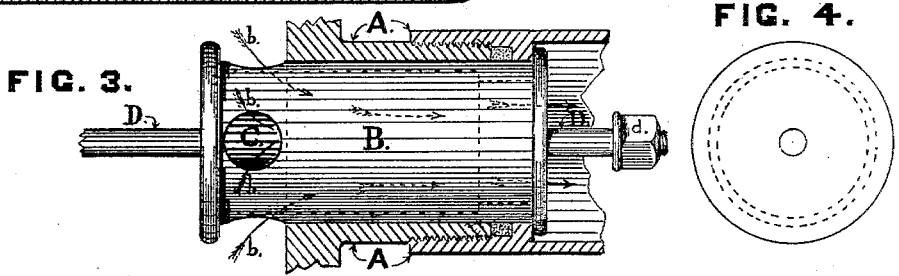

Figure 1 is a longitudinal section showing valve open. Fig. 2 is a longitudinal section showing valve closed. Fig. 3 is a sectional drawing of the valve-seat and stuffing-box and parallel view of the valve. Fig. 4 is a view of inward end of valve.

Similar letters refer to similar parts throughout the several drawings.

I will now endeavor to explain the working of the valve.

The piston or plunger of the engine or pump in which my valve is being used is at the extreme inward stroke, as in Fig. 1, and the valve open. A motive force, as steam, air, or gas, being admitted into the cylinder on the side opposite the valve B, the piston or plunger is forced toward the valve, the rod D sliding through the stuffing-box therein until the nut $d'$ on the rod D contacts with the head of the valve, and the remaining portion of the motion of the piston, continuing to the extreme outward stroke, pushes the valve outward and closes the valve, at which moment the motive force is exhausted from the side of the piston on which it has just operated and is transferred, through the passage-way, to the side toward the valve and forces the piston or plunger in the opposite direction, the rod D sliding through the stuffing-box in the valve until the nut on its outer end contacts with said stuffing-box, and the remaining portion of the motion of the piston or plunger, continuing to the extreme inward stroke, opens the valve, and the motive force, as steam, gas, air, or water, is exhausted from the cylinder, at which moment motive force is again admitted, as before, and the operation is repeated, and so on.

It is plain to be seen that when the length of the sliding rod D is adjusted to correspond with the stroke of piston or plunger the action of the valve must be in perfect time therewith, thus assuring perfect results as for the object sought, which is that the valve be open while the piston or plunger is approaching or moving toward it and that the valve be closed while the piston or plunger is receding or moving from it.

What I claim as my invention, and desire to secure by Letters Patent, is—

The combination in an engine or pump having a cylinder, or shell, and head having a seat and stuffing-box therein containing a valve B having a stuffing-box through which operates a sliding rod D having means at both its ends for adjustment to operate in combination with the piston, or plunger, substantially as set forth.

R. D. WATSON.

Witnesses:
CHARLES R. CLAPP,
M. B. MCCARTHY.